(12) United States Patent
Virieux

(10) Patent No.: US 10,194,005 B2
(45) Date of Patent: Jan. 29, 2019

(54) METHOD TO RETRIEVE PERSONAL CUSTOMER DATA OF A CUSTOMER FOR DELIVERING ONLINE SERVICE TO SAID CUSTOMER

(71) Applicant: Alcatel Lucent, Boulogne Billancourt (FR)

(72) Inventor: Philippe Virieux, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 976 days.

(21) Appl. No.: 14/378,513

(22) PCT Filed: Jan. 30, 2013

(86) PCT No.: PCT/EP2013/051797
§ 371 (c)(1),
(2) Date: Aug. 13, 2014

(87) PCT Pub. No.: WO2013/120694
PCT Pub. Date: Aug. 22, 2013

(65) Prior Publication Data
US 2015/0039728 A1    Feb. 5, 2015

(30) Foreign Application Priority Data

Feb. 17, 2012 (EP) ..................... 12290059

(51) Int. Cl.
*H04L 29/06* (2006.01)
*H04W 12/06* (2009.01)
(Continued)

(52) U.S. Cl.
CPC .............. *H04L 69/00* (2013.01); *H04L 61/00* (2013.01); *H04L 67/02* (2013.01); *H04L 69/22* (2013.01);
(Continued)

(58) Field of Classification Search
CPC ......... H04L 69/00; H04L 67/02; H04L 62/00; H04L 69/22; H04L 61/30; H04L 61/1541;
(Continued)

(56) References Cited

U.S. PATENT DOCUMENTS

| 7,167,842 B1 * | 1/2007 | Josephson, II | G06Q 20/382 705/44 |
| 7,209,758 B1 * | 4/2007 | Moll | G01S 5/0009 455/328 |

(Continued)

OTHER PUBLICATIONS

International Search Report for PCT/EP2013/051797 dated Dec. 11, 2013.

*Primary Examiner* — Patrice L Winder
*Assistant Examiner* — Aye M Aung
(74) *Attorney, Agent, or Firm* — Fay Sharpe LLP

(57) ABSTRACT

The invention relates to a method to retrieve personal customer data of a customer for delivering online service to said customer, with the steps:—a service supplier (3) initiates the sending of a network identifier (51) of a mobile node (5), used to communicate with the online service supplier (3) and bound to the customer by a mobile network operator (7), to an application programming interface (API) platform (9) with a request to manage the customer data,—the API platform (9) identifies the mobile network operator (7) of the mobile node (5), and forwards the network identifier (51) and request to retrieve the customer data to said mobile network operator (7) of the mobile node (5),—the mobile network operator (7) uses the network identifier to identify the customer and sends the requested personal customer data contained in a data repository of the mobile network operator to the API platform (9),—the service supplier (3) retrieves the personal customer data at the API platform (9). The invention also concerns the associated API platform (9).

15 Claims, 2 Drawing Sheets

(51) Int. Cl.
*H04L 29/08* (2006.01)
*H04L 29/12* (2006.01)
*H04W 8/18* (2009.01)
*G06Q 10/06* (2012.01)
*G06Q 30/00* (2012.01)

(52) U.S. Cl.
CPC .......... *H04W 12/06* (2013.01); *G06Q 10/067* (2013.01); *G06Q 30/00* (2013.01); *H04W 8/18* (2013.01)

(58) Field of Classification Search
CPC ............... H04L 61/203; H04L 61/2592; H04L 61/3015; H04W 12/06; H04W 8/18; G06Q 30/00; G06Q 20/00
USPC .......................................................... 709/219
See application file for complete search history.

(56) References Cited

U.S. PATENT DOCUMENTS

| | | | | |
|---|---|---|---|---|
| 8,082,353 B2* | 12/2011 | Huber | ................ | G06Q 20/1235 709/229 |
| 8,756,657 B2* | 6/2014 | Bijlsma | ................ | H04W 12/06 455/421 |
| 9,386,332 B2* | 7/2016 | Hao | ................... | H04N 21/2393 |
| 2002/0095589 A1* | 7/2002 | Keech | ................ | G06F 21/6209 713/189 |
| 2002/0156797 A1* | 10/2002 | Lee | ................... | G06F 17/30286 |
| 2004/0064708 A1* | 4/2004 | Angelo | ................... | G06F 21/34 713/185 |
| 2004/0088349 A1* | 5/2004 | Beck | ................... | H04L 63/0407 709/203 |
| 2005/0021818 A1 | 1/2005 | Singhal et al. | | |
| 2005/0188220 A1* | 8/2005 | Nilsson | ................... | H04L 63/04 726/5 |
| 2007/0220079 A1* | 9/2007 | Chandrasekharan | ... | G06F 9/465 709/202 |
| 2007/0233566 A1* | 10/2007 | Zlotin | ................... | G06Q 30/02 705/14.41 |
| 2009/0011758 A1* | 1/2009 | Aoki | ...................... | H04W 4/02 455/432.1 |
| 2009/0248680 A1* | 10/2009 | Kalavade | ........... | G06Q 30/0267 |
| 2010/0211636 A1* | 8/2010 | Starkenburg | ....... | H04N 7/17318 709/203 |
| 2010/0262668 A1* | 10/2010 | Piett | .................... | H04W 76/007 709/206 |
| 2011/0016321 A1* | 1/2011 | Sundaram | ............. | H04L 63/061 713/171 |
| 2012/0036075 A1* | 2/2012 | Klein | ..................... | G06Q 20/16 705/64 |
| 2012/0066010 A1* | 3/2012 | Williams | ........... | G06Q 10/0633 705/4 |
| 2012/0129452 A1* | 5/2012 | Koh | ..................... | G06Q 20/352 455/41.1 |
| 2013/0273882 A1* | 10/2013 | Walsh | ..................... | H04W 4/26 455/407 |
| 2014/0349610 A1* | 11/2014 | Dimperio | ............. | H04W 12/02 455/411 |

* cited by examiner

METHOD TO RETRIEVE PERSONAL CUSTOMER DATA OF A CUSTOMER FOR DELIVERING ONLINE SERVICE TO SAID CUSTOMER

The invention relates to a method to retrieve personal customer data of a customer for delivering online service to said customer. In particular, the method applies in the case of a user using a mobile node to access a service supplier platform.

The widespread of mobile terminals or mobile nodes such as smartphones, electronic pads and laptops represents an enormous potential for online service suppliers such as online shops, banks, and transport companies.

The customer of the online service suppliers is of course the user of the mobile node which is merely used as means to access the online service supplier platform, for example the internet site of the service supplier. Such a mobile node is most cases exclusively bound to one user by contract with a mobile network operator.

The mobile node is identified in the network by use of a set of network identifiers contained for example in a SIM card (Subscriber Identity Module) and or network addresses (home, temporary, etc. . . . ).

Such network identifiers are used to address data packets in networks to the mobile node independently from its changing geographical position.

As such, some network identifiers are immediately and automatically known to the communicating elements of the networks, in particular to the platforms of the service supplier.

Nevertheless, the provided service is addressed to the customer, a physical person, which cannot be uniquely identified by the network identifiers, but by only by data from a user profile, such as name, surname, address.

It is usual for the customers requiring an online service to identify themselves to the service suppliers through a profile stored at service supplier level, where the relevant data is given in by the user at first connection. The user then identifies himself or herself by uploading said profile at the following connections. The uploading may be rendered automatic by use of cookies.

In particular, the user has to manually type in the data in fields of forms when creating the profile at first connection for every service supplier. This repetitive filling of questionnaires is often perceived as cumbersome and might even repel potential customers.

In order to overcome at least partially the aforementioned drawbacks, the invention has for object a method to retrieve personal customer data of a customer for delivering online service to said customer, with the steps:
  a service supplier initiates the sending of a network identifier of a mobile node, used to communicate with the online service supplier and bound to the customer by a mobile network operator, to an application programming interface (API) platform with a request to manage the customer data,
  the API platform identifies the mobile network operator of the mobile node, and forwards the network identifier and request to retrieve the customer data to said mobile network operator of the mobile node,
  the mobile network operator uses the network identifier to identify the customer and sends the requested personal customer data contained in a data repository of the mobile network operator to the API platform,
  the service supplier retrieves the personal customer data at the API platform.

Said method allows an automatic management of the customer data using the already existing databases of the mobile network operators in a way secured by the presence of the API platform that acts as middleman between the service supplier and the mobile network operator.

The method may present one or more of the following characteristics, taken together or separately.

The API platform is an open API platform, and said open API platform may use HTTP and/or HTTPS protocols.

The mobile node sends to the API platform a HTTP or HTTPS message in which a header containing an identifier of the mobile network operator of the mobile node is added by 3G network nodes forwarding the message and operated by the mobile network operator, and said header is used by the API platform to identify the mobile network operator. As an alternative to that, the API platform may initiate a prompting of the customer to identify his mobile network operator.

The network identifier and the request for the customer data is sent by the online service supplier. In an alternative embodiment, the network identifier and the request for the customer data is sent by the mobile node.

It further comprises a step in which the user performs an authentication process to complete the process.

The authentication process comprises typing a PIN code.

The API platform forwards a temporary user identification token with the data to the online service supplier.

It comprises a step wherein the mobile network operator sends a permanent identity federation token to the service supplier to permanently identify the customer.

Also, the invention has for object the associated Application Programming Interface platform wherein it comprises at least one application programming interface configured to receive a network identifier of a mobile node used to communicate with an online service supplier and bound to a customer by a mobile network operator and a request to retrieve customer data, and at least one application programming interface to transmit said customer data to the online service supplier, the Application Programming Interface platform being configured to receive customer data requests and network identifiers from a service supplier using the first least one application programming interface.

The Application Programming Interface platform may further comprise at least one application programming interface configured to transmit a network identifier of a mobile node and a request to retrieve customer data to a mobile network operator, and the Application Programming Interface platform being configured to forward said customer data requests and network identifiers to the mobile network operator associated to the network identifiers and to receive the requested customer data in return using the second at least one application programming interface.

Finally, the invention has for object a data storage medium storing a machine-executable program for performing a method to retrieve personal customer data of a customer for delivering online service to said customer as previously described.

Other characteristics and advantages will appear at the reading of the following description of the surrounded figures, among which:

On all figures, the same references relate to the same elements.

As used herein, the term "service supplier" designates any entity offering an online service. Such service suppliers are for example online shops, banks, insurance companies or transport companies. The service supplied is for example online shopping, counsel, creation and/or consultation of an account, fidelity program, virtual goods selling, positioning and guidance. The aforementioned service suppliers are given as mere examples.

Figure 1:
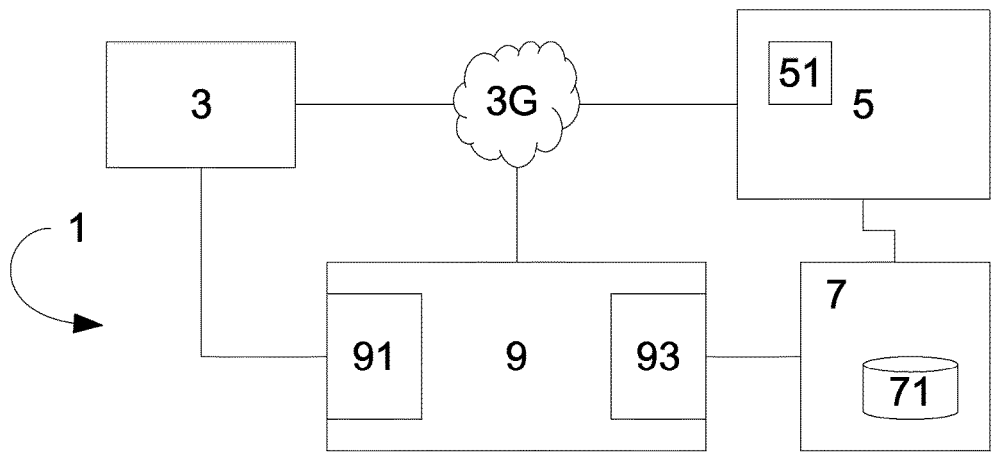
FIG. 1 is a schematic view of the different involved elements of a network.

FIG. 1 depicts the different network communicating elements of a telecom network 1. This network 1 comprises part of a mobile network such as a 3G network, and a part of internet network, using IP technology for example. As an alternative, the mobile network part may rely on other mobile communication technologies, such as LTE, EDGE, WiFi or GPRS.

Most network communicating elements as described may be realized by a single equipment such as a server, a computer, or may be distributed among several equipments such as a group of servers. Most of them are thus comprising sets of instructions, executed by one or more processor, and means to communicate with each other, potentially via the network 1.

As can be seen on FIG. 1 a first communicating element is an online service supplier 3. The online service supplier 3 can be for example an online shopping site at which the user is purchasing goods, a mailbox having a message for the user to read or anything the like.

The online service supplier 3 communicates with a mobile node 5, via a mobile network, such as a 3G network, comprising several mobile network nodes or relays (radios, modems etc.), that convert and transmit radio signal emitted in direction of and/or from the mobile node 5. The mobile node 5 can for example be a smartphone, an electronic pad or a laptop computer. The mobile node 5 possesses a certain number of network identifiers 51, communicated in particular to the mobile network elements (3G), to allow permanent addressing of data packets to the mobile node 5 in the mobile network (3G) independently from its geographical position.

Also represented in FIG. 1 is mobile network operator 7 as a network communicating element. The customer owning the mobile node 5 is bound by contract to the mobile network operator 7 who has at hand data repositories 71, for example stored on servers, containing personal customer data.

Only the mobile network operator 7 is able to set the correspondence between the network identifiers on the one hand and such personal customer data (for example name, address etc) on the other hand.

A further network communicating element is an application programming interface (API) platform 9 which is set up in a way to communicate with the service supplier 3.

The application programming interfaces are used herein as machine to machine (M2M) interfaces by the previously mentioned network elements 3, 5, 7 to communicate in automated or semi-automated fashion.

The API platform 9 comprises for example a first set 91 of application programming interfaces to communicate with the applications developed and used by the service supplier 3, and a second set 93 of application programming interfaces to communicate with applications on the side of the mobile network operators 7.

The API platform 9 can be constituted using open standard applications such as HTTP, SOAP and REST, and may therefore be called an open API platform 9.

The first set 91 of application programming interfaces is configured to receive the network identifier 51 of the mobile node 5 used to communicate with the online service supplier 3 and a request for customer data. The second set 93 of application programming interfaces is configured to transmit the network identifier 51 and the request for customer data to the mobile network operators 7. A third set of application programming interfaces, or potentially the first one 91, are configured to transmit said data to the online service supplier 3.

It should be noted that the communications to and from the mobile node 5 occur via mobile network (e.g. 3G), but access via for example femto base station is also possible.

The other network communicating elements will preferably use standard IP networks to communicate with each other.

For explanation of the present method to retrieve personal customer data, it is depicted a typical exemplary situation where a customer is connecting to an online shopping site. Once the goods to purchase are selected (placed in the virtual "shopping kart" such sites feature), the customer has to give the site a certain amount of personal data, such as name and address for shipping the goods.

For example upon signing the contract for the subscription for the mobile node 5, the mobile network operator 7 has stored in data repository 71 personal customer data, for example as a customer profile, filled out by the customer himself. Such a personal customer date is, in its simplest form mandatory for addressing the bills for the mobile node 5 service, and contains as such at least the name and address of the customer. The data may also contain more details about the consumer, such as date of birth (for age restrictions), email address, a preferred language for applications, secondary shipping addresses, phone numbers and the like.

It should be noted that the correspondence between network identifiers 51 and user profile data is not automatically established for privacy reasons, even if the exclusive relationship the users have with, e.g., their smartphones would make the linking of the two relevant. The mobile network operators 7 are therefore the only ones able to ensure automatic identification of the user by means of the network identifiers 51.

The customer data is stored in data repositories 71 on servers owned and managed by the mobile network operator 7. Access to such data repositories 71 is to be strictly restricted, as the data they store is meant to be strictly confidential, and is in most countries protected by law (privacy policies).

The service suppliers 3 will in most cases not require all personal data stored by the network operator 7, for example the complete customer profile, but rather specific parts of it depending on the service proposed (e.g. name and address for shipping goods, email address to send a message). Therefore, even the access to one single profile must be restricted, so that only the pertinent data is made accessible to the online service supplier 3.

The Application Programming Interface platform 9 is configured to receive customer data requests and network identifiers 51 from service suppliers 3 using the first set of application programming interfaces 91, to forward said customer data requests and network identifiers 51 to the mobile network operator 7 associated to the network identifiers 51 and to receive the requested customer data in return using the second set of application programming interfaces 93 and to send it to the service supplier 3.

Such an API platform 9 can be run on a single server or be dislocated in several servers (cloud computing). The API platform 9 in substance aggregates the translation and transmission application programming interfaces for the network elements.

It is task of the API platform 9 to ascertain, translate and forward the requests for customer data from the service supplier 3 to the mobile network operators 7, and to return said data from the mobile network operators 7 to the service suppliers 3.

It could be said that the API platform 9 acts as a security element between the service suppliers 3 on the one hand and the network operators 7 on the other hand and manages what and to which extent personal data from a customer can be retrieved.

Figure 2:
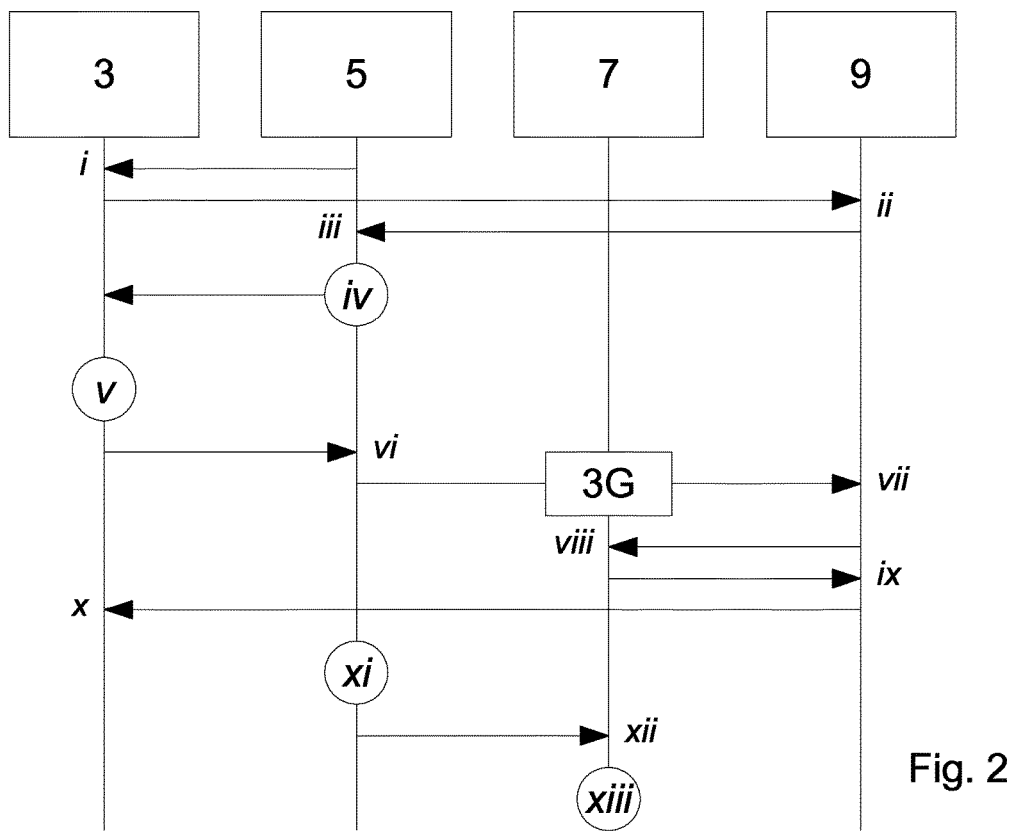
FIG. 2 is a schematic representation of the steps of a first embodiment of the invention.

FIG. 2 depicts the steps of one embodiment of the method according to the invention. The different elements 3, 5, 7, 9 depicted in FIG. 1 are represented as vertical lines, the communications between them are represented by arrows, and internally performed steps by circles on the line of the element performing them, chronologically arranged from top to bottom. For this example, the case of a user/customer creating an account at a service supplier 3 using a mobile node 5, via a 3G network is considered.

Step i is the service request from the mobile node 5 to the service supplier 3, for example, by activation of a profile creation URL at a website, causing the browser on side of the mobile node 5 or the service supplier 3 to check for subscription for automated customer data retrieving of both entities. For example, the customer may have to click on a button to confirm that his mobile network operator 7 will be used to retrieve the customer data.

In step ii the service supplier 3 sends an application key to the API platform 9, along with the customer data request. This application key is used to ascertain that the application used by the service supplier 3 is legitimate, and may proceed with requests for automated data retrieving. In return to said application key, the API platform 9 returns, in this particular case, in step iii a message indicating that the user is not yet authenticated. This message contains in the body fields to build a redirect request for the mobile node 5.

Authentication of the customer is required to prevent fraud in case the mobile node 3 has been stolen. This authentication may basically be done by typing in a PIN (Personal Identification Number) as in depicted step iv, and, provided that the PIN is correct, generating a valid key sent in further responses, and required to complete the data retrieving. The result of the authentication is sent (either by the mobile node 5 or by the API platform 9) to the service supplier 3 to continue the process.

In step v the service supplier 3 prepares an authentication URL, with the redirect request built using the fields of the message in step iii. This authentication URL is sent to the mobile node in step vi.

When the activation URL is triggered, the mobile node 5 sends the network identifiers 51 to the API platform 9. The message containing the network identifiers 51 transits through mobile (3G) network nodes forwarding the message in step vii, and operated by the mobile network operator 7 of the mobile node 5. Said mobile network nodes (e.g. WAP Gateway, Access Gateway) add to the message a HTTP header containing an identifier of the mobile network operator 7, which is read by the API platform 9 upon receiving the message.

In the case of a mobile node 5 using for example a radio femto-cell base station as access point, the signal may not transit through a mobile network (3G). Therefore, if the open API platform does not receive a message with a valid mobile network operator in the headers, it may automatically prompt the user to identify his mobile network, for example in a list of all operators of the geographical area where the customer is.

The API platform is thus in possession of the network identifiers 51 of the node 5, of an identifier of the mobile network operator 7, and has ensured that the user gave his consent and that he and the service supplier 3 are legitimate.

Therefore, the API platform then sends a message in step viii to the mobile network operator, containing the request for the personal data and the possible tokens and keys for security. The mobile network operator 7 receives for example via dedicated servers said message and extracts the personal customer data which is sent in return to the API platform 9 in step ix from data repositories 71.

The API platform 9 then returns in step x the data in fields of a message according to the protocol set up in the service supplier 3 application to the service supplier 3 so that said data can be retrieved automatically.

In following, optional, step xi, the customer checks the validity of the data. For example, the customer may have displayed on mobile node 3 the automatically filled fields of the original URL. If the customer then changes part of the data, for example, an address (for shipping), he may be proposed to update the data on mobile network operator 5 side. In case the customer accepts this option, the filled, modified fields are sent via API platform 9 to the mobile network operator 7 in step xii and used to update the databanks in step xiii.

In the discussed method to retrieve private customer data, the API platform 9 acts as middleman between the service supplier 3 and the mobile network operator 7. It acts as request filter for the mobile network operator 7, and translates the different requests from the applications if needed. It is also in charge of authentication matters.

For an even better retrieving of the data in the databanks, a federation of the customer identity can be set up between different service suppliers 3 and the mobile network operator 7.

This identity federation requires the mobile network operator 7 to associate a unique federation token to each customer in the databank. In case the customer subscribes to the identity federation program for at least one service supplier 3, this federation token is communicated to said service supplier 3 after authentication steps iii to ix, and may be used at further connections to perform automatic and faster authentication.

This identity federation token is independent from the mobile nodes, and as such directly usable to identify the customer himself. For example, in the case of a customer having changed his mobile node (e.g. for a newer smartphone version), or possessing multiple mobile nodes 5, this federation token allows the service suppliers 3 to identify automatically said customer in himself.

Also, the method may comprise a step wherein the API platform 9 sends a temporary identification token to the service supplier 3. This temporary identification token may be used to identify temporarily the customer in other steps or in case the process must be interrupted and resumed afterward.

The method may also comprise the use of memorized data such as cookies generated during the exchange of messages to allow faster additional authentication steps and resuming the process.

This identity federation also allows the service suppliers 3 to further personalize the offered services over the mobile networks.

For example, a railway company may implement antennas in a specific area around a train station, used as short to middle range WiFi base-stations. When entering the coverage area of said antennas, a mobile node 5 featuring an application specific to the identity federation program may automatically respond with its customer identity federation token, so that it is automatically identified.

The service supplier 3, here the railway company, then checks its own profile of the identified customer, and adapts its service to the data stored therein.

For example, if records of a train ticket purchase are stored, the application may propose either the position of shops or entertainment possibilities close-by, the shortest way to the boarding platform, or propositions to buy a new ticket in the next equivalent train, according to the time schedule.

Figure 3:
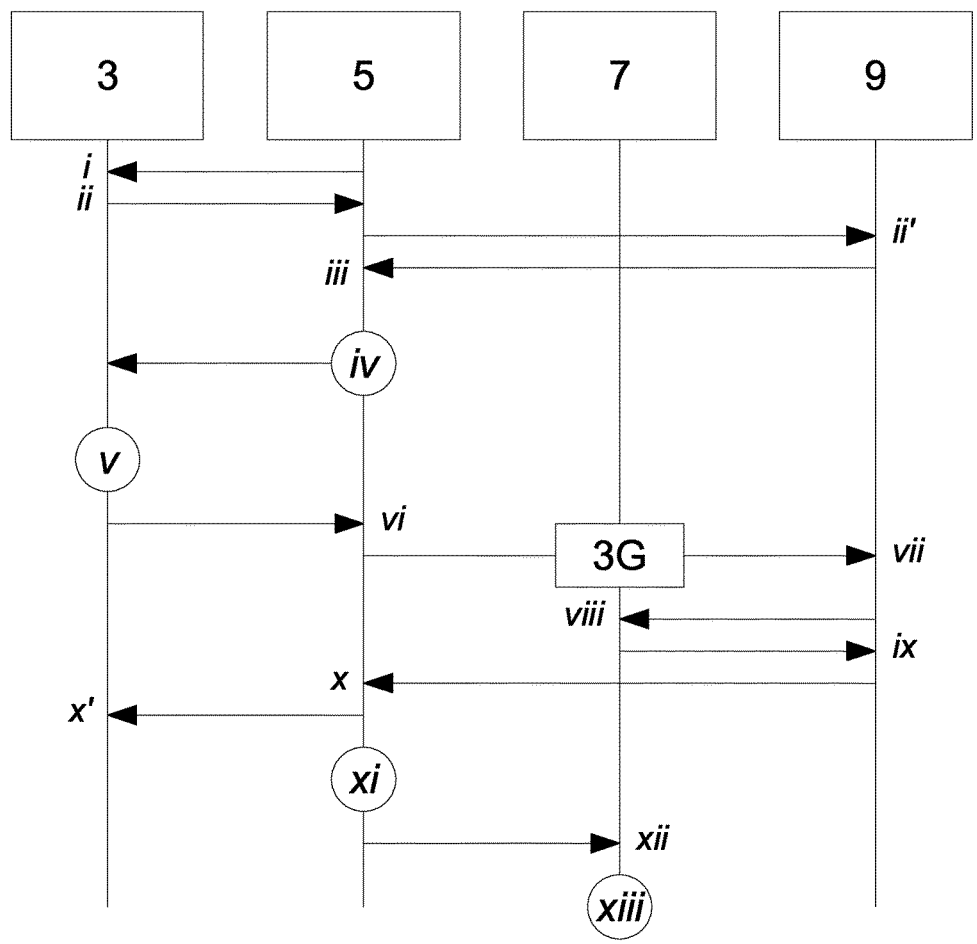
FIG. 3 is a schematic representation of the steps of an alternate embodiment of the invention.

A specific embodiment of the method is depicted in FIG. 3. In said figure, the API platform 9 only communicates with the mobile node 5 and the mobile network operator 7. In particular, the service supplier 3 only communicates with the mobile node 5.

To do so, step ii is modified in that the service supplier 3 sends the application key to the mobile node 5 instead of the API platform 9. The application key is then forwarded to the API platform 9 by the mobile node 5 in additional step ii'.

Also, in step x, the API platform 9 does not return the private customer data directly to the service supplier 3, but to the mobile node 5, which in its turn forwards the customer data to the service supplier 3 in an additional step x'.

In a more general fashion, the mobile node 5 is in this embodiment used as a bridge between the service supplier 3 and the API platform 9. In this embodiment, the service supplier 3 does not handle any identifier or key. This strengthens the privacy preservation in the process.

By placing an API platform as middle man between the service supplier 3, the mobile node 5 and the mobile network provider, the invention allows an identification of the customer behind the mobile node 5 used to communicate. The identified user/customer can then be offered a more personal service, and an automatic and secure retrieving of the personal data of the user/customer can be performed.

Since only the participating customers deliver their identity in a targeted and controlled fashion, and since only few network identifiers, maybe even none at all, are delivered to the service supplier 3, the invention allows to overcome the otherwise necessary compromise between online service personalization and privacy preservation.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method to retrieve personal customer data of a customer for delivering online service to said customer:
    an online service supplier initiates the sending of a network identifier of a mobile node, used to communicate with the online service supplier and bound to the customer by a mobile network operator, to an application programming interface platform (API) with a request to retrieve the customer data,
    the API platform identifies the mobile network operator of the mobile node, and forwards the network identifier and request to retrieve the customer data to said mobile network operator of the mobile node,
    the mobile network operator uses the network identifier to identify the customer and sends the requested personal customer data contained in a data repository of the mobile network operator to the API platform,
    the online service supplier retrieves the personal customer data at the API platform.

2. The method of claim 1, wherein the API platform is an open API platform.

3. The method of claim 2, wherein the open API platform uses HTTP and/or HTTPS protocols.

4. The method of claim 3, wherein the mobile node sends to the API platform an HTTP or HTTPS message in which a header containing an identifier of the mobile network operator of the mobile node is added by 3G network nodes forwarding the message and operated by the mobile network operator, and wherein said header is used by the API platform to identify the mobile network operator.

5. The method of claim 3, wherein the API platform initiates a prompting of the customer to identify his mobile network operator.

6. The method of claim 1, wherein the network identifier and the request for the customer data is sent by the online service supplier.

7. The method of claim 1, wherein the network identifier and the request for the customer data is sent by the mobile node.

8. The method of claim 1, wherein the user performs an authentication process.

9. The method of claim 8, wherein the authentication process comprises typing a PIN code.

10. The method of claim 1, wherein the API platform forwards a temporary user identification token with the data to the online service supplier.

11. The method of claim 1, wherein it comprises a step wherein the mobile network operator sends a permanent identity federation token to the service supplier to permanently identify the customer.

12. An Application Programming Interface server comprising:
    at least one processor configured to operate as:
    at least one first application programming interface configured to receive a network identifier of a mobile node used to communicate with an online service supplier and bound to a customer by a mobile network operator and to receive a request to retrieve customer data,
    an operator identifier configured to determine the identity of the network operator of the mobile node based on one of: information in a message header of an HTTP or HTTPS message sent by the mobile node to the API server, the header being added by 3G network nodes forwarding the message and operated by the network operator and a response from the user to a prompt for network operator identity information,
    an operator communicator configured to forward at least the request to retrieve the customer data to the identified mobile network operator and to receive the customer data therefrom, and
    at least one second application programming interface configured to transmit said customer data to the online service supplier, the Application Programming Interface platform being configured to receive customer data requests and network identifiers from service suppliers using the at least one first application programming interface.

13. The Application Programming Interface platform server of claim 12, wherein the at least one processor is further configured as:

at least one third application programming interface configured to transmit a network identifier of a mobile node and a request to retrieve customer data to a mobile network operator, and to forward said customer data requests and network identifiers to the mobile network operator associated to the network identifiers and to receive the requested customer data in return using the at least one second application programming interface.

14. A non-transitory computer readable data storage medium storing a machine-executable program for performing a method to retrieve personal customer data of a customer for delivering online service to said customer:

an online service supplier initiates the sending of a network identifier of a mobile node, used to communicate with the online service supplier and bound to the customer by a mobile network operator, to an application programming interface platform with a request to manage the customer data, the API platform identifies the mobile network operator of the mobile node, and forwards the network identifier and request to retrieve the customer data to said mobile network operator of the mobile node, the mobile network operator uses the network identifier to identify the customer and sends the requested personal customer data contained in a data repository of the mobile network operator to the API platform, the service supplier retrieves the personal customer data at the API platform.

15. A non-transitory computer readable data storage medium storing a machine-executable program for configuring at least one processor as recited in claim 12.

* * * * *